Figure 1:
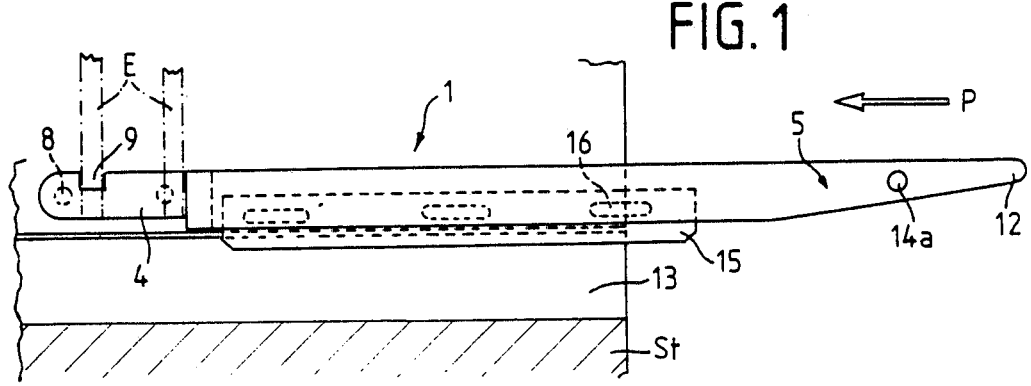

United States Patent [19]

Veser

[11] Patent Number: 4,653,181

[45] Date of Patent: Mar. 31, 1987

[54] COIL INSERTION STRIP FOR STATORS OF ELECTRIC MACHINES

[76] Inventor: Franz Veser, Kanalstrasse 16, 7980 Ravensburg, Fed. Rep. of Germany

[21] Appl. No.: 821,539

[22] Filed: Jan. 22, 1986

[30] Foreign Application Priority Data

Jan. 22, 1985 [DE] Fed. Rep. of Germany ....... 3501879

[51] Int. Cl.$^4$ .......................................... H02K 15/06
[52] U.S. Cl. ........................................ 29/736; 29/596
[58] Field of Search .................. 29/596, 732, 734, 736

[56] References Cited

U.S. PATENT DOCUMENTS 4,372,039 2/1983 Bailey ..................................... 29/734

Primary Examiner—Carl E. Hall
Attorney, Agent, or Firm—Spencer & Frank

[57] ABSTRACT

To introduce wire coils into stators of electric machines, improved isertion strips are proposed. To make the production of the insertion strips (1) cheaper and, in particular, to make it possible to use them for the joint insertion of interconnected coil groups, the insertion strips (1) are made of plastic. They consist of two elastically spreadable tongues, in which guide lamallae (15) made of spring steel are embedded. A foot part (4) is molded on one end of each tongue for releasable mutual connection and for attachment to an insertion tool (E). The foot part adjoins a parallel region of the tongues, which in turn adjoins the spread region of the tongues with an increasing distance between them up to the tongue tips (12).

Crosspins engaging into corresponding holes in the adjacent tongue of the next adjacent insertion strip block the wire passage between the strips.

13 Claims, 13 Drawing Figures

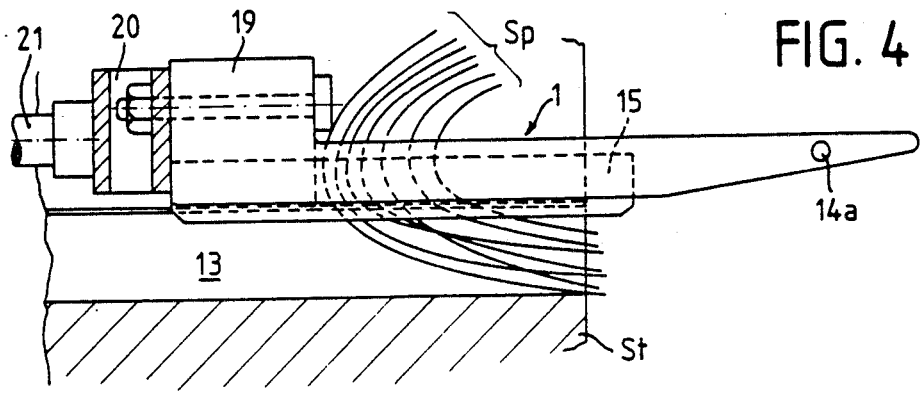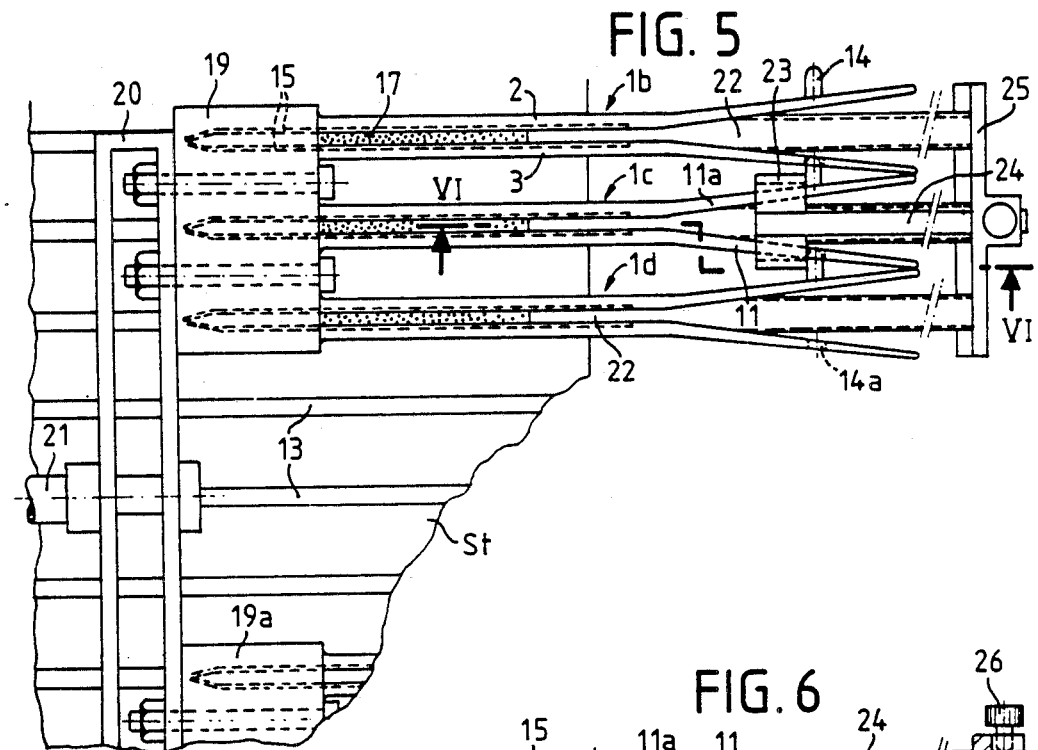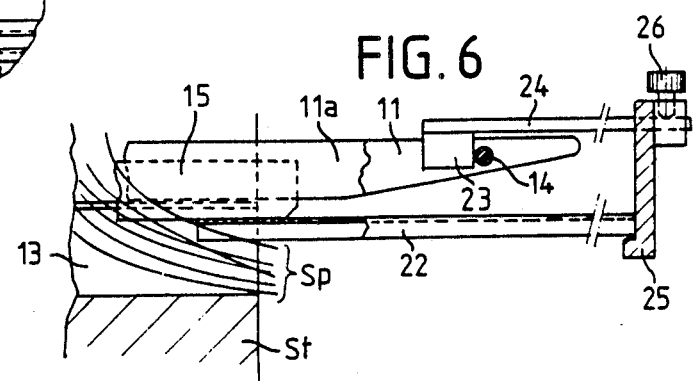

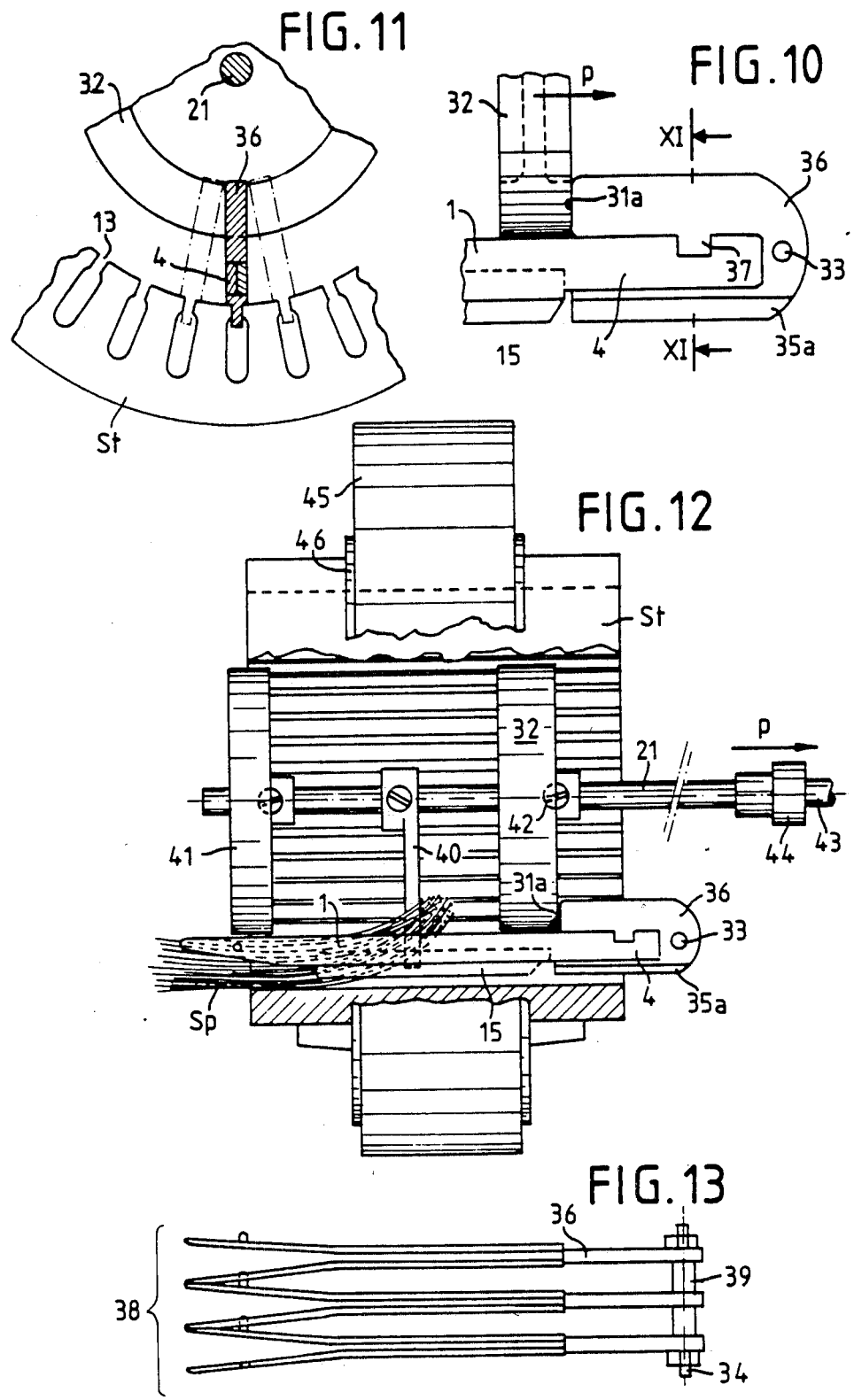

COIL INSERTION STRIP FOR STATORS OF ELECTRIC MACHINES

The invention relates to a coil insertion strip which is inserted so as to be axially displaceable into the stator grooves of electric machines and which, to receive a coil string, has two elastically spreadable plastic tongues connected to one another at the strip foot part and provided with guide lamellae for guiding the strip in the stator groove.

A coil insertion strip of this type is known from German Pat. No. 2,658,891. The two strip tongues are connected firmly to one another at the strip foot part. They are made straight and at rest spread open in a similar way to tweezers. However, when the strip is inserted, foot part first, into the stator groove a little way, the tongues also come up against one another with their tips. The tongue tips therefore have to be drawn apart from one another and the strip has to be spread open in this way, so that a coil string can be introduced. The insertion strips have usually been made of steel up to now, and the thin guide lamellae produced from especially elastic spring sheet-metal have been rivetted to the tongues. It is also known from the abovementioned publication, however, to produce the strips from plastic, the guide lamellae being cast into the tongues.

In an insertion tool known from German Pat. No. 3,409,684, insertion strips which are to that extent of the same form are used. An attempt is made to solve the problem of spreading open the tongues by placing the tongue tips of adjacent insertion strips against one another in pairs in a special operation, before the insertion of the coils, and attaching small elastic caps over them. Furthermore, in these insertion strips, the strip foot is connected positively to a power-operated insertion tool. However, the insertion tools and consequently also the insertion strips have to be matched exactly to the stator inside diameter. It is therefore necessary to keep a considerable quantity of insertion tools and insertion strips in stock, even to make it possible to deal with only the most common stator sizes.

The object on which the invention is based is to propose a coil insertion strip, into which the coil strings can be threaded more easily, especially when working with interconnected coil sets, the individual coils of which are to be introduced into the stator simultaneously.

The general aim of the invention is to ensure that coils are introduced efficiently into stators of electric machines by means of insertion strips. The insertion strips produced should have a low weight, be easy to handle and be reusable many times. This will keep low the outlay in terms of stock-keeping and the replacement of damaged strips, particularly in repair shops.

The aim of the invention is also to prevent by special means individual wires from coming between two adjacent insertion strips when the coil strings are threaded in. It will also become possible to introduce at the same time as the coil string so-called cover strips which in relation to the groove slot cover the coil string already located in the stator groove.

Another aim of the invention is to connect the guide lamellae to the strip tongues in an especially reliable way, so that the insertion strips have a long useful life and the enamelled coil wires are not damaged during the insertion operation.

The aim of the invention is also to provide a tool with especially short insertion strips for the mass production of electric motors of the same size.

In contrast to the known positive connection between the insertion strip and the insertion tool, the invention will provide a non-positive connection making it possible to apply the insertion tool to the insertion strips after these have already been inserted a little way into the stator grooves by means of their foot parts. This is intended to exert not only the axial pull, but also a radial force component on the insertion strips, so that they are pressed onto the stator teeth.

The aim of the invention is also to provide an adaptor, by means of which it is possible to couple non-positively to a simple insertion tool insertion strips which are per se designed for positive connection to the insertion tool.

Another aim is to connect several insertion strips, inserted into stator grooves located next to one another, releasably to one another in the transverse direction, to make it easier to introduce coil groups.

The aim of the invention is also to provide measures which make it easier to introduce the insertion strips into the stator grooves and give the strips better guidance when they are pulled through.

Finally, it is an aim of the invention to equip the insertion tool moving the insertion strips with auxiliary tools which make it easier to introduce the coils in an orderly way and which are suitable for as many different stator inside diameters as possible.

An overall aim of the invention is to propose auxiliary winding appliances which are particularly suitable for use in small factories and smaller electric-motor repair workshops. A problem for these businesses is that many stators delivered for repair are special designs with unusual dimensions. This entails a particularly high outlay in terms of modifications and adjustments and in terms of the quantities of insertion tools kept in stock.

Starting from a coil insertion strip of the type described in the introduction, the object of the invention is achieved when the tongues are produced from an elastomer by injection- or compression-molding and are shaped in such a way that the insertion strip has adjoining the foot part a region in which the tongues extend parallel to and at a distance from one another, and when adjoining this region it forms a coil insertion zone which has a tongue clearance increasing with an increasing distance from the foot part and the length of which corresponds at least to the width of the flat coil string, and the spreading angle of which is such that the tongue tips of the adjacent strips inserted in the stator rest against one another. This shape of the strips ensures that the tongues are spread open even when the strips are partially inserted into the stator grooves. Pronounced V-shaped coil insertion zones, in which the coil strings can be inserted directly and faultlessly, are obtained. So that the tongue tips of adjacent insertion strips rest exactly against one another, it is proposed that one strip tongue in each case be provided with a laterally projecting crosspin and that the other strip tongue possess at this point a receiving bore for the crosspin. It is possible to attach a sliding-cover engaging means on the crosspin, and consequently the crosspins should have sufficient dimensions for this tensile load. Furthermore, the crosspins serve as a block, should a coil wire nevertheless inadvertently come between the insertion strips.

The strip tongues are preferably made as individual parts and are connected to one another at the foot part by preferably press stud-like means releasable in a non-destructive way. This simplifies production and reduces the costs of replacing damaged insertion strips, since the tongues can be replaced individually. Especially durable strip tongues are obtained if the guide lamella extends obliquely through the tongue body relative to the cross-section, in such a way that the lamella parts engaging round the tooth edges of the stator emerge from the plastic at the lower tongue edges adjacent to one another. The coil wires are protected in a particularly careful way as a result of this form. However, the guide lamellae can also be connected to the strip tongues by means of adhesives, the upper edge of the lamellae being embedded and being flush with the tongue surface.

To provide an especially handy insertion tool for production factories, it is proposed that several insertion strips should together form a one-piece insertion body. These insertion strips merge as it were at the foot parts and can consequently easily be screwed as a unit by means of a tie bar of appropriate dimensions. In contrast, where individual insertion strips are concerned, the strip foot has suitable structures, for example recesses, so that it can be connected positively to an insertion tool.

Starting from this, to improve the subject of the invention even further, it is proposed that the foot part of the insertion strip be provided, on the topside located opposite the guide lamellae, with a thrust surface, to which the force of a thrust disk arranged on the draw shank of the drawing device is transmitted when the coils are drawn in. A non-positive coupling of this type between the insertion strips and the drawing device is easier to handle. The shape of the foot part changes essentially because it projects upwards relative to the top edge of the tongue. In a further very substantial improvement, the said thrust surface extends obliquely relative to the thrust force, in such a way that during the drawing-in operation a force component pressing the foot part into the stator groove arises on the thrust surface.

For subsequently equipping existing insertion strips of the old type, the foot part of which has a recess, it is proposed to use a one-piece plastic receiving shackle which is provided with a thrust surface and which can be attached onto the foot part, surrounds the latter and retains it in the pulling direction. In particular, the receiving shackle can be pushed laterally onto the foot part, a projection engaging into the recess of the foot part.

So that several insertion strips can be connected selectively to one another in the transverse direction in the foot-part region, the foot part or the receiving shackle is provided with a transverse bore. A connecting threaded shank can be inserted into this.

Finally, in an expedient development of the insertion strip described, there is molded on the foot part or on the receiving shackle a guide rib which is aligned with the guide lamellae. It thereby becomes substantially easier to insert the foot parts into the gap between the stator teeth.

Figure 2:
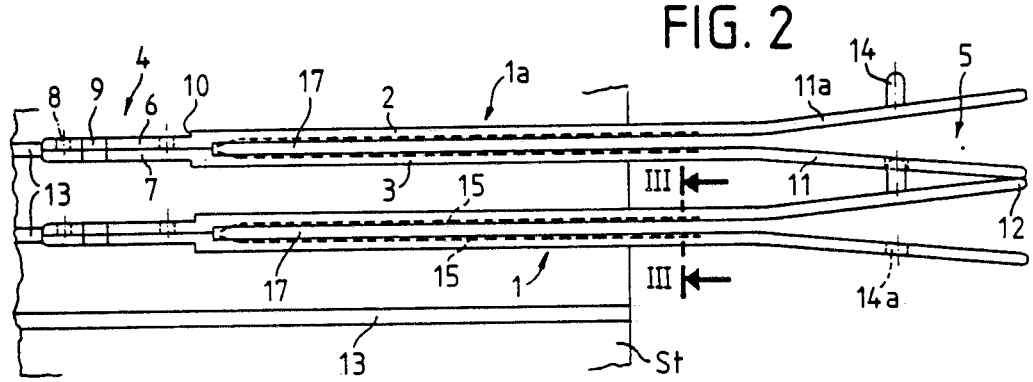
Figure 3:
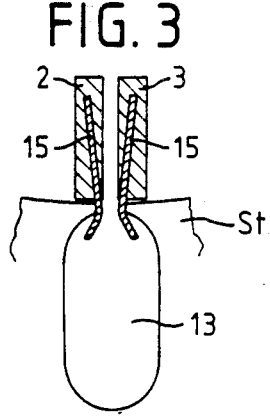
Figure 7:
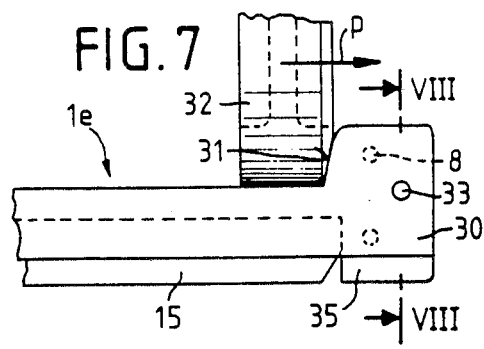
Figure 8:
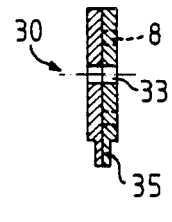
Figure 9:
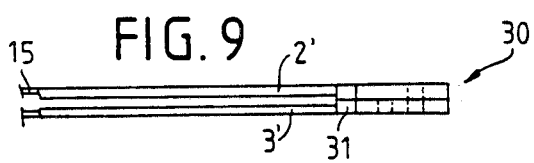

Further details of the invention are explained by reference to the drawing which illustrates exemplary embodiments of the invention and in which:

FIG. 1 shows a side view of the insertion strip inserted into the stator,

FIG. 2 shows a plan view of two strips which are inserted into a stator cut-out, FIG. 3 shows an enlarged cross-section III—III from FIG. 2, FIG. 4 shows a side view of an insertion body, FIG. 5 shows a plan view of FIG. 4 with grouped insertion strips and a sliding-cover engaging means, FIG. 6 shows a section VI—VI from FIG. 5, FIG. 7 shows a side view of the foot part of another insertion strip on a larger Scale, FIG. 8 shows a cross-section VIII—VIII of the foot part according to FIG. 7, FIG. 9 shows an insertion strip according to FIG. 7, seen from above, FIG. 10 shows a side view of the foot part of an insertion strip according to FIG. 1 with a receiving shackle, FIG. 11 shows a cross-section XI—XI with a stator also being illustrated, FIG. 12 shows an axial section through a stator with a insertion tool and an insertion strip according to FIG. 10, and FIG. 13 shows a plan view of a group of three insertion strips according to FIG. 12. de The stator cut-outs shown in FIGS. 2 and 5 are laid out in the horizontal plane.

The insertion strip 1 according to FIGS. 1, 2 and 3 consists of two tongues 2 and 3, on which a foot part 4 is molded at one end and a coil insertion zone 5 at the other end. The foot part is formed by two tongue extensions 6 and 7 which are placed against one another and which are connected releasably to one another by means of the molded-on press studs 8. For a positive connection between the strip 1 and an insertion tool E, the foot part 4 is provided with a recess 9 and a stepped edge 10. The insertion zone 5 is a spreading space obtained as a result of the molded-on angling of the tongue head parts 11, 11a, the spreading angle being such that the tongue tips 12 of adjacent insertion strips 1, 1a inserted in the stator grooves 13 rest against one another.

In the insertion zone 5, the tongue head parts 11, 11a are provided respectively with a laterally projecting crosspin 14 and a receiving bore 14a for this pin. Moreover, the tongue head parts 11, 11a extend forwards conically.

The guide lamellae 15 are embedded in the tongues 2, 3. In the present exemplary embodiment, the lamellae consist of thin elastic sheet-steel strips and, according to FIG. 3, are formed in the plastic of the tongue when the latter is produced by injection molding. To make an intimate positive connection between these parts, the lamellae are provided with perforations 16. Furthermore, the lamellae 15 extend obliquely through the tongues (FIG. 3), in such a way that the distance between the lamellae parts projecting from the tongues corresponds to the groove-slot width, so that there is a step-free transition for the insertion of the coils. The lower edge portions of the guide lamellae 15 are bent up in the manner of horns, so that they can gain a hold on the tooth flanks.

The strip foot parts 4 are stepped on the inside, so that a closed receiving space 17 for the flat coil string Sp is formed, with the result that the latter can be pushed inwards without jamming, until it is already located in the initial part of the stator groove 13 at the start of the insertion operation, as a result of which the insertion can be carried out much more quickly. Furthermore, there are no obstructions caused by jammed wires when the strip is removed after the insertion operation.

To insert or draw the coils Sp into the stator St by means of the insertion strips according to the invention, the insertion strips connected to a insertion tool E are first pushed into the stator grooves 13 by means of their guide lamellae 15, until it is guaranteed that the lamellae 15 grasped with a slight transverse tension by the grooves exert a reliable guiding effect. Subsequently, the coil strings Sp are pushed into the insertion zone 5 in the direction of the arrow P (FIG. 1) and are pressed in up to the end of the receiving space 17, and at the same time the closed tongue tips 12 guarantee that the coils are threaded in reliably even when the wires are very thin. Moreover, because the insertion zone 5 is spread open symmetrically relative to the groove axis, the direction of insertion of the sliding covers 22 (FIGS. 5 and 6) can be sighted without difficulty, thus making it substantially easier to insert the sliding covers 22 than hitherto. The crosspins 14 are pushed into the bores 14a as a result of the additional spreading of the tongues which arises when the coil is inserted, and block the passage between the strips 1, 1a, so that the further penetration of stray wires between the strips, which is very troublesome, can be stopped.

The conical form of the tongues in the insertion zone 5 makes it easier to attach the coils when several insertion strips are used next to one another.

FIGS. 4, 5 and 6 show an example of a further embodiment of a plastic insertion strip according to the invention, which is especially suitable for large and very small stator diameters.

Here, the insertion tool consists of an insertion body 19, 19a made of plastic, on which the insertion strips 1b, 1c, 1d are integrally molded. The guide lamellae 15 are embedded in the body 19 and in the strip tongues. The other features of FIGS. 4 and 5 correspond accordingly to those of FIGS. 1 to 3.

The insertion body 19 is designed, for example, to receive a group of three strips 1b, 1c, 1d for the insertion of interconnected coil groups of a four-pole stator winding, the insertion body 19a of the second group also being indicated. For the complete insertion of these strip groups equipped with coil sets, the insertion bodies 19, 19a can be combined into a single-insertion unit and fastened to a common tiebar 20. This is connected via a draw shank 21 to a controllable drawing device, so that the entire insertion unit can be drawn through the stator in a single workstep, and at the same time the attached sliding covers 22 are also introduced into the grooves 13.

According to FIGS. 5 and 6, this purpose is served by an engaging means 23 which, when the coil is inserted, is also drawn along by the crosspins 14, the pull being transmitted via a tension element 24 to a sliding plate 25, to which are attached the sliding covers 22 inserted between the guide lamellae 15, so that they are pressed into the grooves 13 together with the insertion strips. To match the particular length of the sliding covers 22, the tension element 24 is connected to the sliding plate 25 so as to be longitudinally adjustable, for example by means of an adjusting screw 26.

The foot part 30, shown in FIGS. 7 to 9, of an insertion strip 1e projects upwards. This projection produces a sloping thrust surface 31 which serves for transmitting to the insertion strip 1e the thrust force p originating from a thrust disk 32. Here again, as shown in FIG. 8, the foot part 30 consists of two halves which are connected to one another by means of press stud 8 and which are respectively integrally molded on the associated tongues 2' and 3'. A transverse bore 33 in the foot part 30 serves for the insertion of a threaded shank 34, as shown in FIG. 13. As an extension of the guide lamellae 15, a guide rib 35 runs on the foot part 30 and makes it easier to introduce the insertion strip into the stator groove 13. The slope of the thrust surface 31 results in a component of the thrust force p which presses the foot part 30 into the stator groove during the insertion operation.

FIGS. 10 and 11 relate to the subsequent equipping of the insertion strip 1 shown in FIG. 1 with a receiving shackle 36 as a device for transmitting the thrust force p to the insertion strip 1. The receiving shackle 36, which can be produced in one piece, consists of a tough elastic plastic and can be attached onto the foot part 4 from the side. The receiving shackle thereby engages round the foot part 4, a projection 37 engaging into the recess 9 of the foot part. As a result, the thrust force p transmitted by the thrust disk 32 to the thrust surface 31a extending at right angles in this example is further transmitted to the foot part 4. Here again, a guide rib 35a makes it easier to insert the receiving shackle 36 into the stator groove 13. The dimensions of the receiving shackle 36 are co-ordinated with the foot part 4, so that the elastic material of the receiving shackle generates a sufficient tension force to retain it on the foot part.

FIG. 12 shows a stator St cut away longitudinally, with the insertion tool contained in it and with an insertion strip according to FIG. 10 during the insertion operation. For the sake of clarity, only a single insertion strip 1 provided with a receiving shackle 36 is shown, the coil Sp already being introduced partially into a groove 13. It must be assumed per se, however, that, to equip the stator, the coils are inserted in groups. As shown in FIG. 13, the arrangement of the coil groups so as to correspond to the winding program can be simplified if several insertion strips are combined into a group 38 according to the groove division and connected to one another. This complete strip group 38 is inserted as a whole in the stator. Mutual connection is carried out by means of the abovementioned threaded shank 34 and by the insertion of spacer pieces 39. The threaded shank passes through the holes 33 in the receiving shackles 36. Even after they have been screwed together, the insertion strips 1 can be replaced individually.

Arranged according to the stator length, the thrust disk 32, an engaging pin 40 and a holding-down disk 41 are then fastened on the draw shank 21 by means of adjusting screws 42. The thrust disk 32 rests against the thrust surface 31a and the engaging pin 40 grasps the coil strings in the region of the coil head. The holding-down disk 41 prevents the coil strings from escaping from the insertion position.

After the tool parts have been arranged on the draw shank 21 in the way described, the latter is connected to the piston rod 43 of a lifting piston via a positive coupling 44, and the insertion operation is started.

The stator St is fastened in a known clamping ring 45 which is rotatable about the stator axis and the inner ring 46 of which, for the next insertion phase, is further rotated and fixed such that the stator grooves to be equipped are located in the lower stator region approximately symmetrically relative to the center axis. Since only a single coil group is inserted during each insertion step, the axis of the draw shank 21 can extend eccentrically relative to the stator axis, and consequently the auxiliary tools 32, 40 and 41 can be used unchanged for different Stator diameters and groove divisions.

I claim:

1. A coil insertion strip which is inserted so as to be axially displaceable into the stator grooves of electric machines and which, for receiving a coil string, has two elastically spreadable plastic tongues connected to one another at the strip foot part and provided with guide lamellae for guiding the strip in the stator groove, wherein the tongues (2, 3) are produced from an elastomer by injection- or compression-molding and are shaped in such a way that the insertion strip (1) has adjoining the foot part a region, in which the tongues extend parallel to and at a distance from one another, and adjoining this region it forms a coil insertion zone (5) which has a tongue clearance increasing with an increasing distance from the foot part and the length of which corresponds at least to the width of the flat coil string (Sp), and the spreading angle of which is such that the tongue tips (12) of adjacent strips inserted into the stator (St) rest against one another.

2. A coil insertion strip as claimed in claim 1, wherein one (2) of its two strip tongues is provided with a laterally projecting crosspin (14) in the region of the coil insertion zone (5), and wherein the other strip tongue (3) has at this point a receiving bore (14a) for the crosspin of the adjacent strip tongue in the stator.

3. A coil insertion strip as claimed in claim 1, wherein the two strip tongues (2, 3) are of mirror-symmetric form and are connected to one another at the foot part (4) by press stud-like means (8) releasable in a nondestructive way.

4. A coil insertion strip as claimed in claim 1, wherein the part of the guide lamella (15) secured in strip tongue extends in each case obliquely through the tongue body (2, 3), in such a way that only the lamellae parts projecting from the tongues are at a distance from one another which corresponds to the groove aperture width.

5. A coil insertion strip as claimed in claim 1, wherein the guide lamellae are connected to the strip tongues by means of an adhesive, the gluing edge of each lamella being flush with the tongue surface.

6. A coil insertion strip as claimed in claim 1, which, together with further insertion strips, forms a one-piece insertion body (19).

7. A coil insertion strip as claimed in claim 1 wherein the strip foot (4) has structures for positive connection to an insertion tool (E).

8. A coil insertion strip as claimed in claim 1, wherein the foot part (30, 36) of the insertion strip is provided, on the topside located opposite the guide lamellae (15), with a thrust surface (31, 31a), to which the force of a thrust disk (32) arranged on the draw shank (21) of the insertion device is transmitted when the coils are inserted.

9. A coil insertion strip as claimed in claim 8, wherein the thrust surface (31) extends obliquely relative to the thrust force (p), in such a way that, during the insertion operation, a force component pressing the foot part (30) into the stator groove (13) arises on the thrust surface.

10. A coil insertion strip as claimed in claim 8, wherein there is a one-piece plastic receiving shackle (36) which is provided with the thrust surface (31a) and which can be attached onto the foot part (4), surrounds the latter and retains it in the pulling direction.

11. A coil insertion strip as claimed in claim 10, wherein the foot part (30) or the receiving shackle (36) is provided with a transverse bore (33) serving for receiving a cross-connection member (34) for a strip group.

12. A coil insertion strip as claimed in claim 10, wherein the foot part (30) or the receiving shackle (36) is provided with a molded-on guide rib (35, 35a) which is aligned with the guide lamellae (15) and which can be pushed into the stator groove (13).

13. A coil insertion strip as claimed in claim 7, wherein said structures include recesses.

* * * * *